(12) United States Patent
Hori et al.

(10) Patent No.: US 7,607,888 B2
(45) Date of Patent: Oct. 27, 2009

(54) AIR-CONDITIONING SYSTEM

(75) Inventors: Ryoji Hori, Obu (JP); Shuichi Tamaki, Nishio (JP); Hirofumi Sugai, Okazaki (JP); Takeshi Shinagawa, Kariya (JP)

(73) Assignee: DENSO Corporation, Kariya (JP)

( * ) Notice: Subject to any disclaimer, the term of this patent is extended or adjusted under 35 U.S.C. 154(b) by 405 days.

(21) Appl. No.: 11/591,415

(22) Filed: Oct. 26, 2006

(65) Prior Publication Data
US 2007/0105421 A1 May 10, 2007

(30) Foreign Application Priority Data

Nov. 9, 2005 (JP) ............................... 2005-325249
Apr. 17, 2006 (JP) ............................... 2006-113742

(51) Int. Cl.
*F03B 11/02* (2006.01)
(52) U.S. Cl. ................................. 415/214.1
(58) Field of Classification Search ................ 415/203, 415/204, 206, 214.1, 215.1, 213.1
See application file for complete search history.

(56) References Cited

U.S. PATENT DOCUMENTS 5,947,682 A * 9/1999 Moon .......................... 415/200
5,954,476 A * 9/1999 Stewart et al. ............ 415/214.1
6,296,284 B1 10/2001 Weischedel
6,536,474 B2 3/2003 Akahane

FOREIGN PATENT DOCUMENTS

| DE | 94 20 291 | 11/1995 |
|----|-----------|---------|
| EP | 0 414 946 | 3/1991 |
| JP | 06-135220 | 5/1994 |
| JP | 11-294415 | 10/1999 |
| JP | 2001-225632 | 8/2001 |
| JP | 2004-122915 | 4/2004 |

OTHER PUBLICATIONS

Office Action dated Mar. 14, 2008 in Chinese Application No. 2006 10159893 with English translation.

* cited by examiner

*Primary Examiner*—Edward Look
*Assistant Examiner*—Dwayne J White
(74) *Attorney, Agent, or Firm*—Harness, Dickey & Pierce, PLC (57) ABSTRACT

An air-conditioning system able to suppress an increase in size of the joint of an air-conditioner case and improve a sealing ability of the joint, wherein a split case member 11 has an engagement projection 112 provided with a recess 113 and a split case member 12 has an engagement groove 122 provided with a projection 123, the engagement projection 112 and engagement groove 122 being mated to engage the recess 113 and projection 123. Even without providing a plurality of sets of engagement projections 112 and engagement grooves 122, the sealing ability can be improved. Further, the sealing ability can be improved even without making the size of the engagement location larger.

7 Claims, 9 Drawing Sheets

AIR-CONDITIONING SYSTEM

BACKGROUND OF THE INVENTION

1. Field of the Invention

The present invention relates to an air-conditioning system provided with an air-conditioner case comprised of a plurality of separately formed case members.

2. Description of the Related Art

As related art, there is the air-conditioning system disclosed in Japanese Patent Publication (A) No. 2001-225632. In this air-conditioning system, the air-conditioner case is formed split into a first case member and a second case member. An engagement projection formed at a joint face of the first case member and an engagement groove formed in a joint face of the second case member are engaged to form the air-conditioner case.

In the air-conditioner case of this related art, to improve the sealing ability of the joint, a plurality of sets of engagement projections and engagement grooves are provided and high pressure spaces are provided between the plurality of sets of engagement projections and engagement grooves.

However, in the air-conditioning system of this related art, while the sealing ability at the joint of the air-conditioner case is improved, there is the problem that the joint becomes larger in size.

SUMMARY OF THE INVENTION

An object of the present invention is to provide an air-conditioning system suppressing an increase in size of the joint of the air-conditioner case and improving the sealing ability of the joint.

To achieve the object, according to a first aspect of the present invention, there is provided an air-conditioning system provided with an air-conditioner case (10) comprised of a separately formed first case member (11) and second case member (12) joined together by engagement of an engagement projection (112) formed at a joint face (111) of the first case member (11) and an engagement groove (122) formed at a joint face (121) of the second case member (12) and circulating air blown into a passenger compartment inside the air-conditioner case (10), wherein the engagement projection (112) is formed with a recess (113) and the engagement groove (122) is formed with a projection (123) mating with the shape of the recess (113).

Note that the "mating" referred to here can be defined as having a substantially mirror-image profile. "Projection (123) mating with the shape of the recess (113)" means that the recess (113) and the projection (123) have mirror-image profiles with a difference of an extent enabling assembly (engagement) together.

According to this, it is possible to mate the recess (113) formed at the engagement projection (112) and the projection (123) formed at the engagement groove (122) and thereby improve the sealing ability of the location of engagement of the engagement projection (112) and the engagement groove (122).

Even without increasing the sets of engagement projections (112) and engagement grooves (122), the sealing ability can be improved. Further, the sealing ability can be improved without increasing the size of the engagement location.

Further, according to a second aspect of the invention, the projection (123) has flat faces (123a) parallel to an engagement direction (Z) of the engagement projection (112) and the engagement groove (122), and the recess (113) has flat faces (113a) parallel to an engagement direction (Z) mating with the flat faces (123a) of the projection (123).

According to this, the flat faces (123a) of the projection (123) and the flat faces (113a) of the recess (113) mating with the same become surfaces parallel to the engagement direction (Z). Therefore, even if either of the engagement projection (112) or engagement groove (122) moves in the engagement direction (Z) and the engagement state changes somewhat, the sealing ability between the projection (123) and the recess (113) will not easily change. In this way, it is possible to secure stable sealing ability.

Further, according to a third aspect of the present invention, the engagement projection (112) has flat faces (112c) parallel to the engagement direction (Z) at its side surfaces, and the engagement groove (122) has flat faces (122c) parallel to the engagement direction at its side surfaces mating with the flat faces (112c) of the engagement projection (112).

According to this, the flat faces (112c) of the engagement projection (122) and the flat faces (122c) of the engagement groove (122) mating with the same become surfaces parallel to the engagement direction (Z). Therefore, even if either of the engagement projection (112) or engagement groove (122) moves in the engagement direction (Z) and the engagement state changes somewhat, the sealing ability between not only the projection (123) and the recess (113), but also between the engagement projection (112) and the engagement groove (122) will not easily change. In this way, it is possible to secure stabler sealing ability.

Further, in a fourth aspect of the present invention, in an assembled state of the first case member (11) and the second case member (12), that is, when engaging the engagement projection (112) and the engagement groove (122), the projection (123) and the recess (113) are separated from each other to form a clearance (133) between the projection (123) and the recess (113).

According to this, when engaging the engagement projection (112) and the engagement groove (122), the projection (123) and the recess (113) will not easily interfere with each other, so engagement becomes easy.

Further, in a fifth aspect of the invention, in an assembled state of the first case member (11) and the second case member (12), that is, when engaging the engagement projection (112) and the engagement groove (122), the engagement projection (112) and the engagement groove (122) are separated from each other to form a clearance (133) between the engagement projection (112) and the engagement groove (122).

According to this, when engaging the engagement projection (112) and the engagement groove (122), the engagement projection (112) and the engagement groove (122) will not easily interfere with each other, so engagement becomes even easier.

Further, in a sixth aspect of the invention, the projection (223) formed at the engagement groove (122) and the recess (213) formed at the engagement projection (1121) abut against each other.

According to this, the sealing ability between the projection (223) and recess (213) can be reliably improved.

Further, in a seventh aspect of the invention, the projection (223) causes the recess (213) to be opened wider and side surfaces (112e) of the engagement projection (1121) abut against the engagement groove (1221).

According to this, the projection (223) can cause the recess (213) to be opened wider and the side surfaces (112e) of the engagement projection (1121) forming the recess (213) can closely contact the inside of the engagement groove (1221). Therefore, not only do the projection (223) and recess (213)

abut against each other, but also the side surfaces (112e) of the engagement projection (1121) and the engagement groove (1221) abut against each other so as to improve the sealing ability more reliably.

Further, in an eighth aspect of the invention, the projection (223) is wedge shaped.

According to this, the projection (223) can be easily press fit into the recess (213), the recess (213) can be easily opened wider, and the side surfaces (112e) of the engagement projection (1121) forming the recess (213) can closely contact the inside of the engagement groove (1221).

Further, in a ninth aspect of the invention, the engagement projection (1121) is comprised of a flat plate part (112a) with a substantially uniform width and a tip (112b) with a width gradually reduced from a front end of the flat plate part (112a) toward a front end side of the engagement projection (1121), and the recess (213) is sunk down from the tip (112b) and has a bottom (213b) formed at the flat plate part (112a).

According to this, even if the engagement projection (1121) has a tip (112b) which becomes narrower in width the further to the front end side, along with the projection (223) being press fit into the recess (213), the engagement projection (1121) can be easily opened wider and the side surfaces (112e) of the engagement projection (112) can easily closely contact the insides of the engagement groove (1221).

Further, in a 10th aspect of the invention, the engagement projection (112) has guide surfaces (112c) formed in parallel to the engagement direction (Z) of the engagement projection (112) and the engagement groove (122) and sliding with inside surfaces (122c) of the engagement groove (122) parallel to the engagement direction (Z) so as to guide the engagement projection (112) into the engagement groove (122) when engaging the engagement projection (112) and the engagement groove (122), the recess (113) is formed so as to be sunk down in the engagement direction (Z) from a location (112b) at a front end side from a location (112a) of formation of the guide surfaces (112c) of the engagement projection (112) toward a root side of the engagement projection (112), and the recess (113) has a length (L1) in the engagement direction (Z) smaller than a length (L2) of the guide surface (112c) in the engagement direction (Z).

According to this, when assembling together the first case member (11) and second case member (12), the guide surfaces (112c) of the engagement projection (112) guide the engagement projection (112) into the engagement groove (113) to start engagement of the engagement projection (112) and engagement groove (122), then the mating of the recess (113) and projection (123) is started.

That is, the guide action accompanying engagement of the engagement projection (112) and the engagement groove (122) enables the recess (113) and the projection (123) to be reliably mated. Therefore, even of the faces (113a) of the recess (113) extending along the engagement direction (Z) and the faces (123a) of the projection (123) extending along the engagement direction (Z) are close to each other, the recess (113) and the projection (123) can be easily mated. Incidentally, the reference numerals in parentheses after the above means are examples showing the correspondence with the specific means described in the later explained embodiment.

BRIEF DESCRIPTION OF THE DRAWINGS

The present invention may be more fully understood from the description of the preferred embodiments of the invention set forth below together with the accompanying drawings, in which.

BEST MODE FOR WORKING THE INVENTION

Below, embodiments of the present invention will be explained based on the drawings.

First Embodiment

Figure 1:
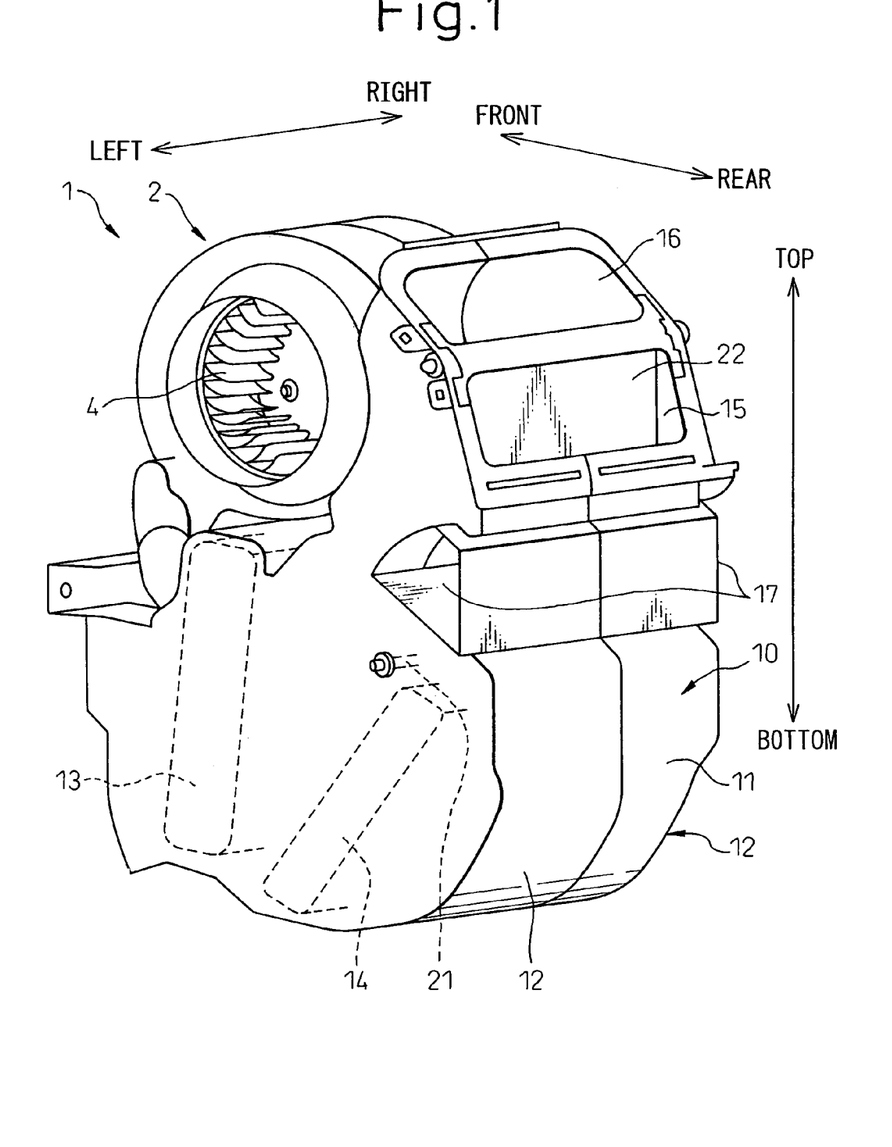
FIG. 1 is a perspective view showing the general configuration of an indoor unit 1 of a vehicular use air-conditioning system in a first embodiment applying the present invention.
Figure 2:
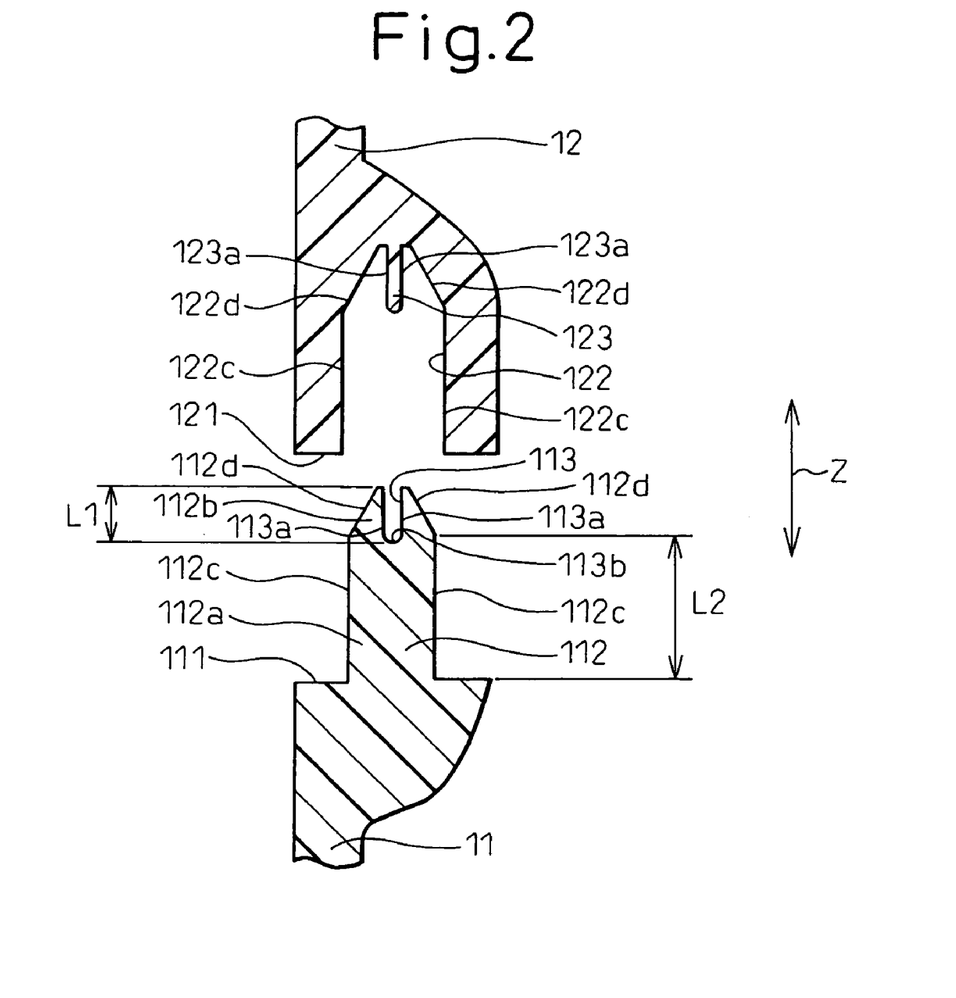
FIG. 2 is a cross-sectional view of principal parts of an air-conditioner case 10 in the indoor unit 1 of the first embodiment and shows the state before joining the separately formed case members together.
Figure 3:
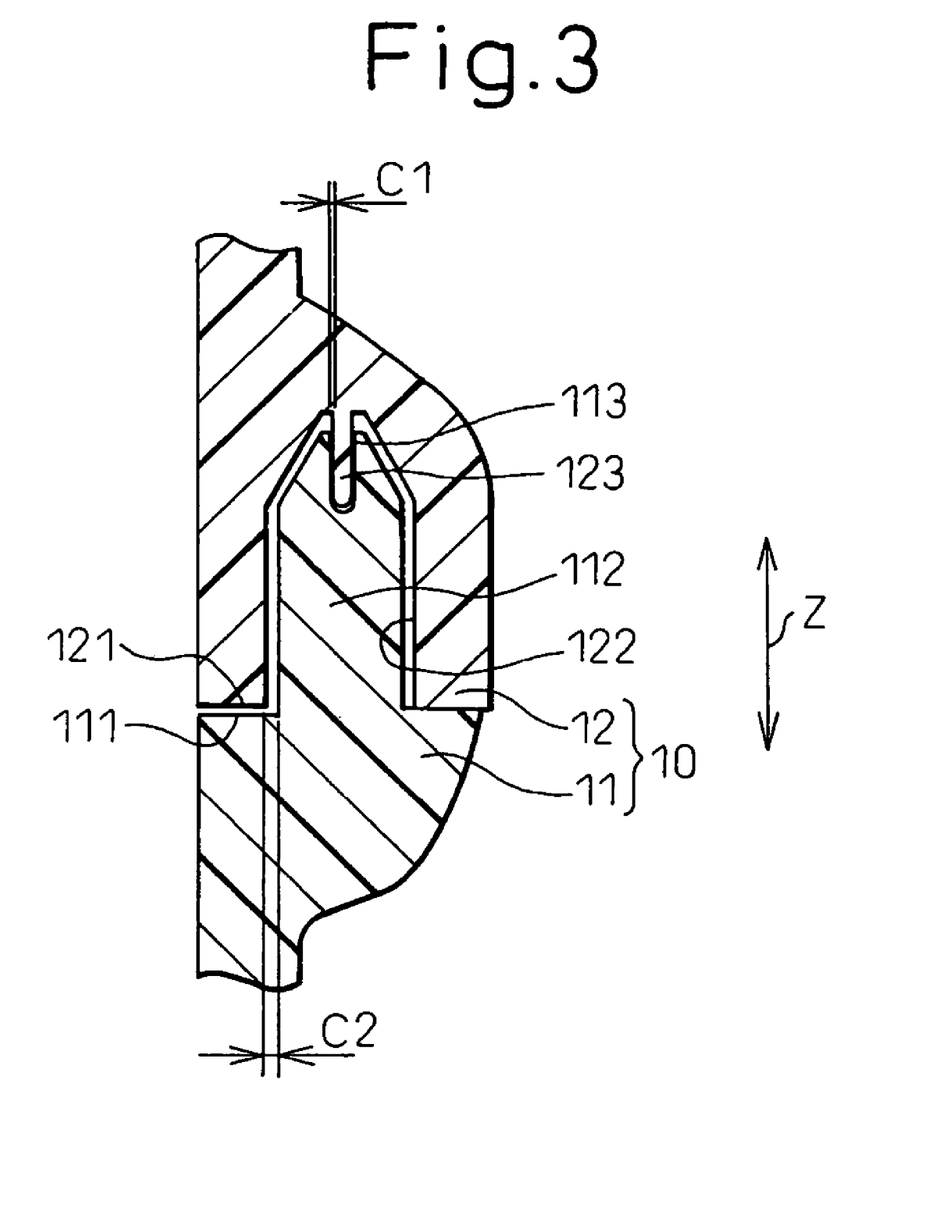
FIG. 3 is a cross-sectional view of principal parts of an air-conditioner case 10 in the indoor unit 1 of the first embodiment and shows the state after joining the separately formed case members together.

The first embodiment applies the present invention to a vehicular use air-conditioning system. FIG. 1 is a perspective view showing the general configuration of an indoor unit 1 of a vehicular use air-conditioning system. FIG. 2 and FIG. 3 are cross-sectional views of principal parts of an air-conditioner case 10 in the indoor unit 1. FIG. 2 shows the state before joining the separately formed case members together, while FIG. 3 shows the state after joining the separately formed case members together.

As shown in FIG. 1, the indoor unit 1 of the vehicular use air-conditioning system has a blower unit 2 and an air-conditioner unit 3 integrally formed. The blower unit 2 is arranged at the front top side at the center of the vehicle width direction of the instrument panel at the front of a passenger compartment.

The blower unit 2 is provided with an inside/outside air switching box (not shown) at the left for switching between the introduction of air inside the compartment and air outside the compartment. At the right of this inside/outside air switching box is arranged a blower. This blower has a blower fan 4 comprised of a centrifugal multiblade fan and a fan drive motor (not shown).

On the other hand, the air-conditioner unit 3 has an air-conditioner case 10 forming an air passage. The air-conditioner case 10 is comprised of a shaped article of a resin such as a polypropylene resin having a certain degree of elasticity and superior strength-wise as well.

This air-conditioner case 10 is formed as schematically a box shape in overall shape split into two in the vertical direction so as to enable the components explained later to be housed. A right case member 11 and a left case member 12 are joined together by engagement tabs, metal spring clips, screws, and other fastening means. Note that in the present embodiment, the blower fan 4 of the blower unit 2 etc. are housed in the air-conditioner case 10.

Here, in the air-conditioner case 10, among the separately formed split case members, the right case member 11 corresponds to the first case member in the present embodiment, while the left case member 12 corresponds to the second case member in the present embodiment.

In the air-conditioner case 10, an air introduction path is provided at the front side of an evaporator 13 below the blower fan 4 (frontmost side of bottom in air-conditioner case 10). Air blown from the blower fan 4 is introduced into this air introduction path. This evaporator 13 is a cooling use heat exchanger cooling the blown air by a low pressure refrigerant of a refrigeration cycle evaporating and absorbing heat from the blown air.

The evaporator 13 is set in a state substantially vertical in the air-conditioner case 10, so the air flowing in from the blower unit 2 passes through the heat exchange unit of the evaporator 13 from the front to the rear.

Further, in the air-conditioner case 10, a heater core 14 is set at the downstream side of the air from the evaporator 13 in a slightly inclined state. This heater core 14 is a heating use heat exchanger using warm water from a not shown vehicle engine (engine cooling water) as a heat source to heat the blown air.

The top surface of the air-conditioner case 10 is formed with a face vent opening 15 communicated with a face vent (not shown) blowing air toward the top side of the passenger compartment (passenger head side) and a defroster vent opening 16 communicated with a defroster vent (not shown) blowing air toward the front window glass of the vehicle adjoining each other. Further, the side surface of the top side of the air-conditioner case 10 is formed with a foot vent opening 17 communicated with a foot vent (not shown) blowing air toward the feet of the passengers in the passenger compartment.

The air-conditioner case 10 is provided inside it with an air mix door 21, a blowing mode door 22, and other door means (some not shown). Due to the operation of these, a predetermined amount of the air passing through the evaporator 13 is heated by the heater core 14, then air-conditioned air is blown out from one or more of the vent openings 15, 16, and 17 in accordance with the blowing mode.

Next, principal parts of the present embodiment will be explained.

As shown in FIG. 2, a joint end face 111 of the right case member 11 is formed with an engagement projection 112 of a rising wall shape extending around the entire surface of the joint face (front-rear direction of paper surface). The joint face 121 of the left case member 12 is formed with an engagement groove 122 extending around the entire surface of the joint face (front-rear direction of paper surface).

As shown in FIG. 3, the air-conditioner case 10 is formed by engaging the engagement projection 112 and engagement groove 122 and mating the joint face 111 of the right case member 11 and the joint face 121 of the left case member 12.

The engagement projection 112 provided at the joint face 111 of the case member 11 is comprised of a flat plate part 112a with a substantially uniform width (thickness in direction perpendicular to engagement direction Z of engagement projection 112 and engagement groove 122 (illustrated left-right direction)) and a triangular cross-section tip 112b gradually decreasing in width the further from the front end of the flat plate part 112a (illustrated top end) to the front end of the engagement projection 112 (illustrated top side).

Due to this, the illustrated left and right surfaces of the flat plate part 112a of the root side of the engagement projection 112 form a pair of flat faces 112c parallel to the engagement direction Z. Further, the illustrated left and right surfaces of the tip 112b of the front end side of the engagement projection 112 form a pair of inclined faces 112d.

The engagement projection 112 of the case member 11 is formed with a substantially U-shaped cross-section recess 113 of a form sunk down into the front end of the tip 112b toward the root side of the flat plate part 112a (toward root side of engagement projection 112, that is, toward the direction of the joint face 111 of the illustrated bottom side) and extending around the entire surface of the joint face.

This recess 113 is sunk down into the tip 112b and has a bottom 113b formed at the region of the flat plate part 112a, so forms a relatively deep groove shape.

On the other hand, the engagement groove 122 formed at the joint face 121 of the case member 12 is shaped to mate with the engagement projection 112 of the case member 11 and is provided with a pair of flat faces 122c parallel to the engagement direction Z mating with the flat faces 112c of the engagement projection 112 and a pair of inclined faces 122d inclined with respect to the engagement direction Z mating with the inclined faces 112d of the engagement projection 112.

Further, the engagement groove 122 of the case member 12 is formed with a projection 123 of a shape mating with the shape of the recess 113 formed in the engagement projection 112 of the case member 11. The projection 123 is forms a columnar cross-section sticking out from the bottom surface of the engagement groove 122 (illustrated top end face) toward the direction of the joint face 121 at the illustrated bottom side and extends around the entire surface of the joint face.

The projection 123 sticking out into the engagement groove 122 has a pair of flat faces 123a parallel to the engagement direction Z at the illustrated left and right sides. Further, the recess 113 provided at the engagement projection 112 has a pair of flat faces 113a parallel to the engagement direction Z mating with the flat faces 123a of the projection 123.

Note that the engagement projection 112 is formed so that the distance between the pair of flat faces 112c is somewhat smaller than the distance between the pair of flat faces 122c of the engagement groove 122. Further, the projection 123 is formed so that the distance between the pair of flat faces 123c is somewhat smaller than the distance between the pair of flat faces 113c of the recess 113.

That is, the engagement projection 112 and the engagement groove 122 are shaped to mate with each other with a gap of an extent enabling easy mutual engagement. Further, the recess 113 and the projection 123 are shaped to mate with each other with a gap of an extent enabling easy assembly (engagement) with each other.

Figure 4:
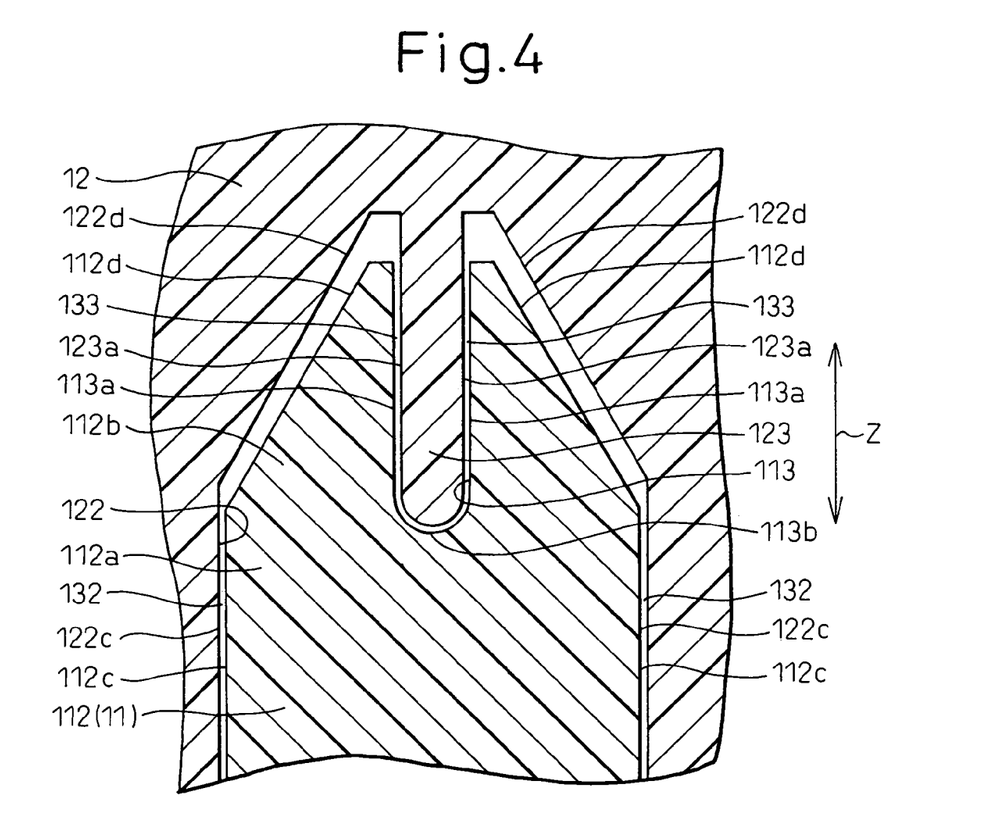
FIG. 4 is an enlarged cross-sectional view of principal parts of an air-conditioner case 10 of the indoor unit 1 in the first embodiment.

Due to this, as shown by the cross-section of principal parts enlarged in FIG. 4, when the engagement projection 112 and engagement groove 122 are engaged, the flat faces 112c of the engagement projection 112 and the flat faces 122c of the engagement groove 122 are slightly separated from each other, i.e., a clearance 132 is formed between the flat faces 112c, 122c. Further, the flat faces 123a of the projection 123 and the flat faces 113a of the recess 113 are slightly separated from each other, i.e., a clearance 133 is formed between the flat faces 113a, 123a.

Note that when engaging the engagement projection 112 and engagement groove 122, the flat faces 112c of the engagement projection 112 are slid against the flat faces (corresponding to inside faces) 122c of the engagement groove 122. The flat faces 112c form guide surfaces for guiding the engagement projection 112 inside the engagement groove 122.

As explained above, the recess 113 is sunk down from the front end of the tip 112b in parallel with the engagement direction Z and has a bottom 113b formed in the region of the flat plate part 112a. In other words, the recess 113 is formed so as to be sunk down parallel to the engagement direction from a location (that is, the tip 112b) at the front end from the location of formation of the flat faces 112c forming the engagement guiding surfaces of the engagement projection 112, that is, the flat plate part 112a, toward the root side of the engagement projection 112 (that is, the joint face 111 of the right case member 11).

Further, a length (depth) L1 in the direction of engagement of the engagement projection 112 of the recess 113 and the engagement groove 122 (illustrated Z-direction) is shorter than a length (height) L2 in the direction of engagement of the flat faces 112c serving as the guide surfaces (illustrated Z-direction).

Further, the engagement groove 122 is formed to mate with the shape of the engagement projection 112, while the projection 123 is formed to mate with the shape of the recess 113. Therefore, the projection 123 has a height in the direction of engagement Z of the engagement projection 112 and engagement groove 122 substantially equal to the depth L1 of the recess 113 and smaller than the length of the flat faces 122c of the engagement groove 122 in the direction of engagement Z of the engagement projection 112 and engagement groove 122 (length substantially equal to length L2 of flat faces 112c in engagement direction).

According to the above-mentioned configuration, it is possible to mate the recess 113 formed in the engagement projection 112 of the split case member 11 and the projection 123 formed at the engagement groove 122 of the split case member 12 to improve the sealing ability of the engagement location of the engagement projection 112 and engagement groove 122.

The amount Q of air leakage at the engagement location can be calculated by the following formula 1:

$$Q = -h^3/12\mu \times dp/dx$$

where, h is the clearance dimension, µ is the fluid (here, air) viscosity, and dp/dx is the degree of change of the pressure loss with respect to the seal length.

By making the clearances 132, 133 relatively small and assembling the members by provision of the recess 113 and the projection 123, a so-called labyrinth structure with a long seal length is formed. Therefore, the pressure loss can be increased and the air leakage can be suppressed.

In this way, even without providing a plurality of sets of engagement projections 112 and engagement grooves 122 like in the related art, the sealing ability can be improved. Further, the sealing ability can be improved even without making the size of the engagement location larger.

Further, the flat faces 123a of the projection 123 and the flat faces 113a of the recess mating with the same are all surfaces parallel to the engagement direction Z. The flat faces 112c of the engagement projection 112 and the flat faces 122c of the engagement groove 122 mating with the same are also all surfaces parallel to the engagement direction Z.

Therefore, even if the positional relationship of the case members 11 and 12 in the engagement direction Z changes somewhat at the engagement location, while the seal length will change somewhat, the clearances 132, 133 will be substantially constant in dimensions, so stable sealing ability can be secured.

Further, since the clearances 132 and 133 are provided, when engaging the engagement projection 112 and engagement groove 122, the engagement projection 112 and engagement groove 122 will not easily interfere with each other and the projection 123 and recess 113 will not easily interfere with each other, so engagement is easy.

Further, when engaging the engagement projection 112 and engagement groove 122, first the inclined faces 112d of the engagement projection 112 enable the engagement projection 112 to be reliably guided into the engagement groove 122. Next, when the engagement begins and the engagement proceeds, the flat faces 112c of the engagement projection 112 are guided by the flat faces 122c of the engagement groove 122.

Further, the recess 113 has a length (depth) L1 in the engagement direction Z smaller than the height L2 of the engagement guide surfaces of the engagement projection 112, that is, the flat faces 112c, in the engagement direction Z. Therefore, after the engagement projection 112 and engagement groove 122 are guided by the guide surfaces, that is, the flat faces 112c, and begin to engage in the Z-direction, the mating of the recess 113 and projection 123 can be started.

That is, the recess 113 and the projection 123 can be mated by the guiding action of the flat faces 112c and 122c of the engagement projection 112 and engagement groove 122. Therefore, even if the surfaces 113a of the recess 113 in the engagement direction Z and the surfaces 123a of the projection 123 in the engagement direction Z are close, the recess 113 and the projection 123 can be easily mated.

In other words, even if the projection 123 and the recess 113 are set with relatively small differences in dimensions, they can be reliably engaged. Due to this, the clearance 133 between the recess 113 and the projection 123 can be made small and the sealing ability can be made more reliable.

Figure 9:
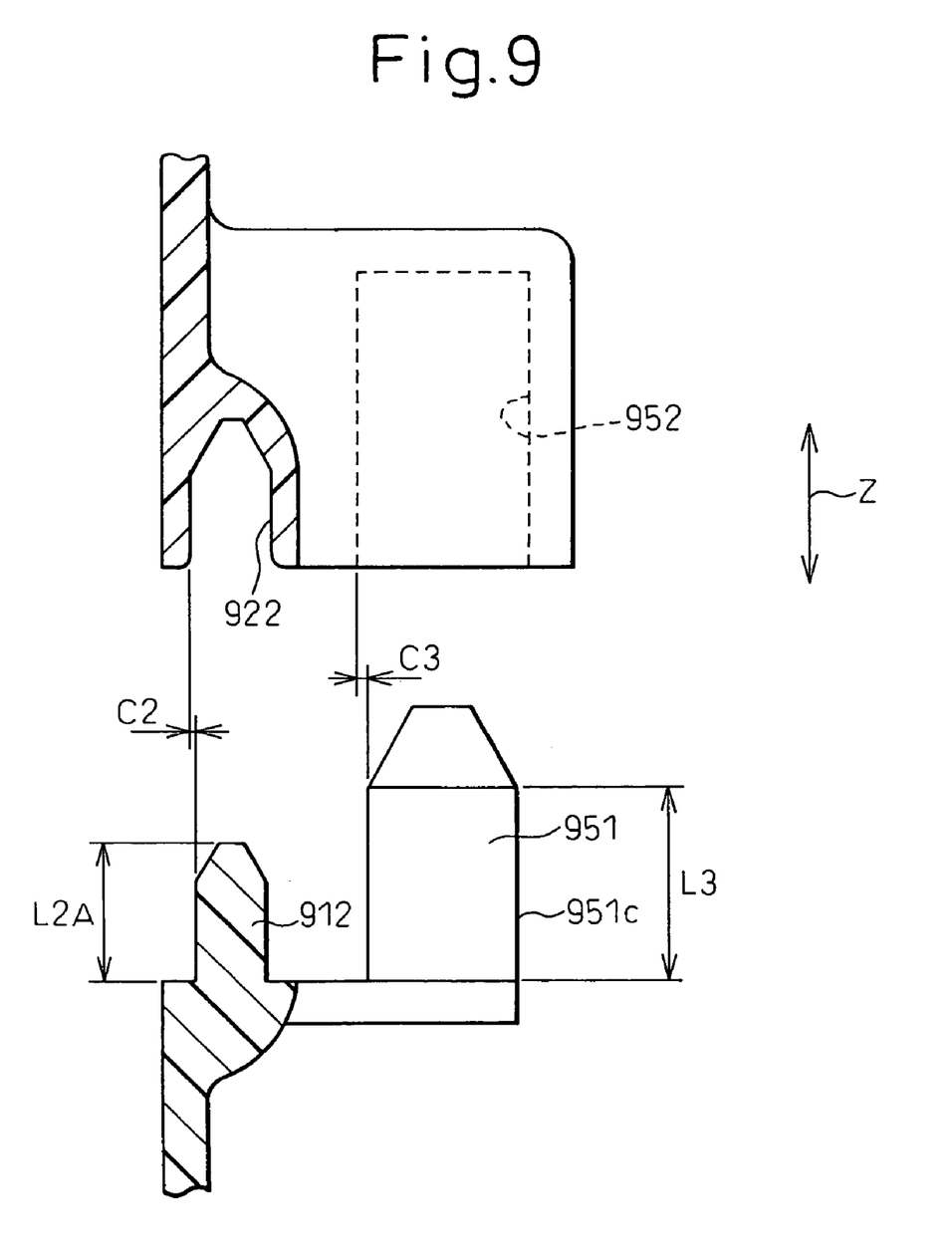
FIG. 9 is a cross-sectional view of principal parts of an example of an air-conditioner case of a conventional indoor unit and shows the state before joining the separately formed case members together.

In the past, for example, as shown in FIG. 9, there has been an air-conditioning system providing a guide pin 951 and guide pin hole 952 at the outside of the case engagement part comprised of the engagement projection 912 and the engagement groove 922. In such an air-conditioning system, a guide function was exhibited by making the height L3 of the guide surfaces 951c of the guide pin 951 in the direction of engagement of the engagement projection 912 and the engagement groove 922 larger than the height L2A of the engagement projection 912 in the engagement direction and starting the engagement guide action of the guide pin 951 into the guide pin hole 952 by the guide surfaces 951c before the engagement of the engagement projection 912 and the engagement groove 922.

Due to this, the assembly clearance dimension C3 between the guide pin 951 and the guide pin hole 952 (in this related art example, 0.5 mm) was made larger than the assembly clearance dimension C2 between the engagement projection 912 and the engagement groove 922 (in this related art example, 0.3 mm) to improve the assembly ability by the large relative assembly clearance dimension guide pin 951 and guide pin hole 952 and secure sealing ability by the small relative assembly clearance dimension engagement projection 912 and engagement groove 922.

As opposed to this, according to the present embodiment, it is possible to give the guide surfaces of the engagement projection 112, that is, the flat faces 112c, and the flat faces 122c of the engagement groove 122 a guide function for engagement of the recess 113 and the projection 123, so the dimension C1 of the clearance 133 (see FIG. 4) between the recess 113 and the projection 123 shown in FIG. 3 (for example, 0.3 mm) can be set smaller than the dimension C2 of the clearance 132 (see FIG. 4) between the engagement projection 112 and engagement groove 122 (for example, 0.5 mm).

Therefore, even if the guide pin is abolished and the size of the engagement part is made smaller than the past, a good sealing ability can be secured without causing a drop in the assembly ability (while improving the assembly ability like with an air-conditioning system of the related art).

Second Embodiment

Next, a second embodiment will be explained based on FIG. 5 to FIG. 7.

The second embodiment differs from the above-mentioned first embodiment in the point of forming an abutting location at the engagement part for sealing. Note that, parts similar to the first embodiment are assigned the same notations and explanations thereof are omitted.

Figure 5:
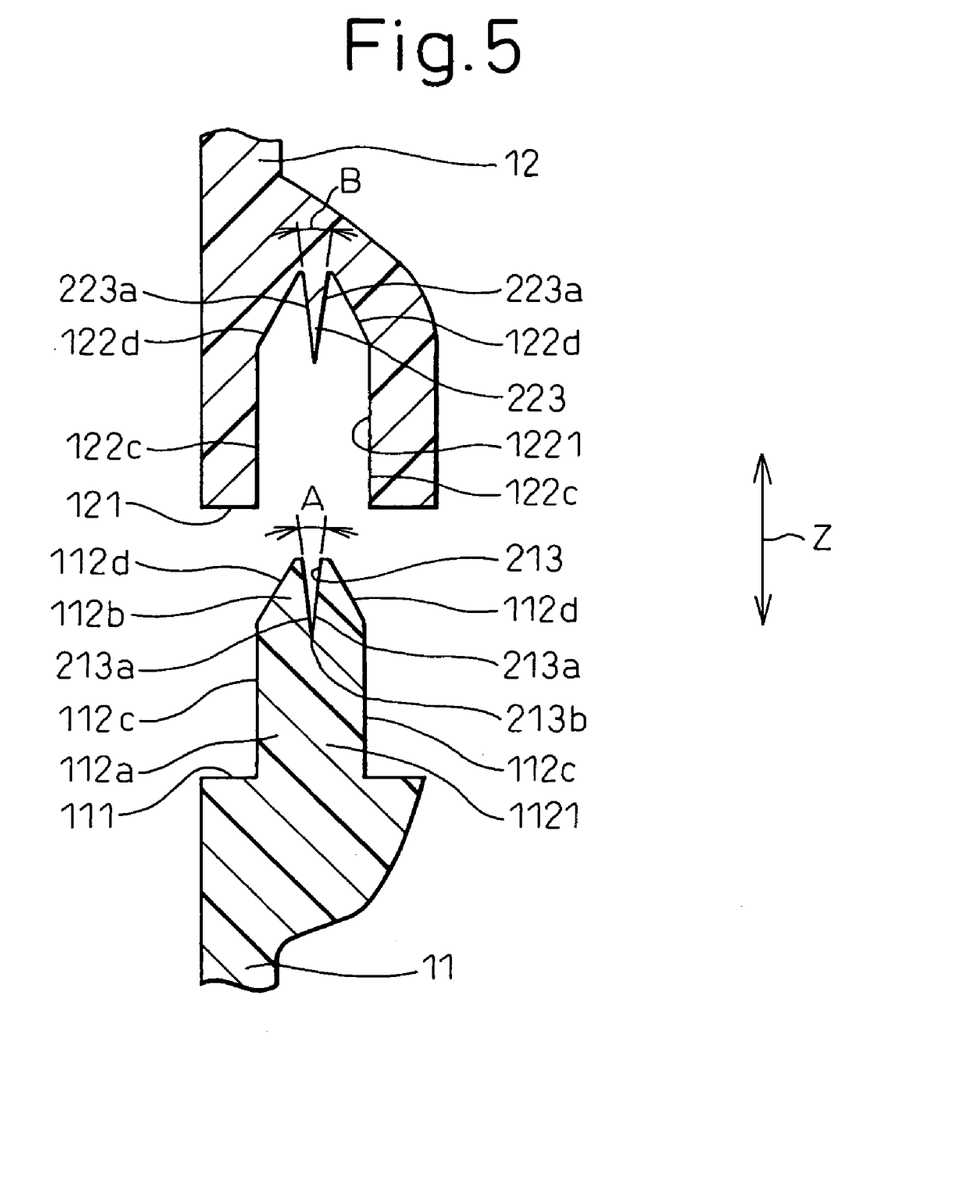
FIG. 5 is a cross-sectional view of principal parts of an air-conditioner case 10 of an indoor unit 1 in a second embodiment and shows the state before joining the separately formed case members together.
Figure 6:
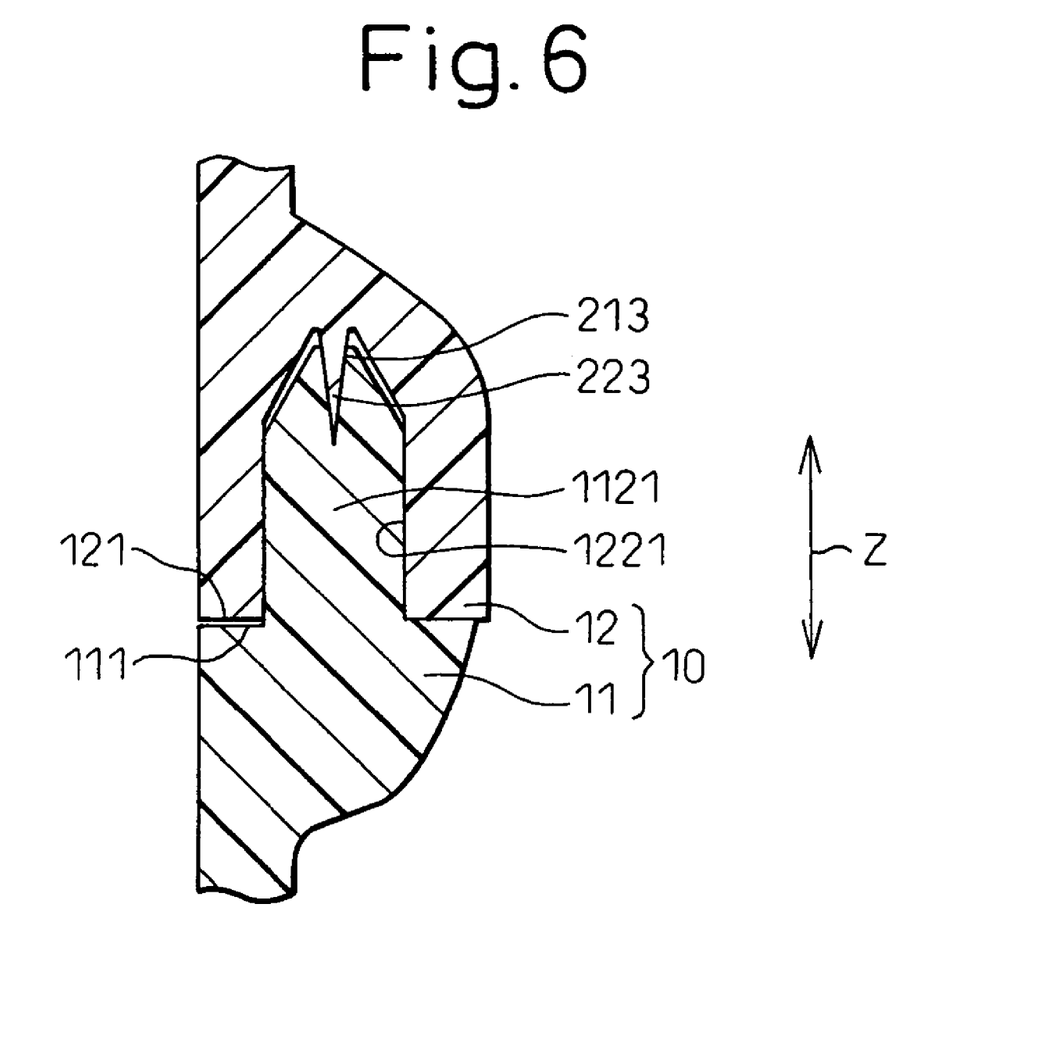
FIG. 6 is a cross-sectional view of principal parts of an air-conditioner case 10 in the indoor unit 1 of the second embodiment and shows the state after joining the separately formed case members together.
Figure 7:
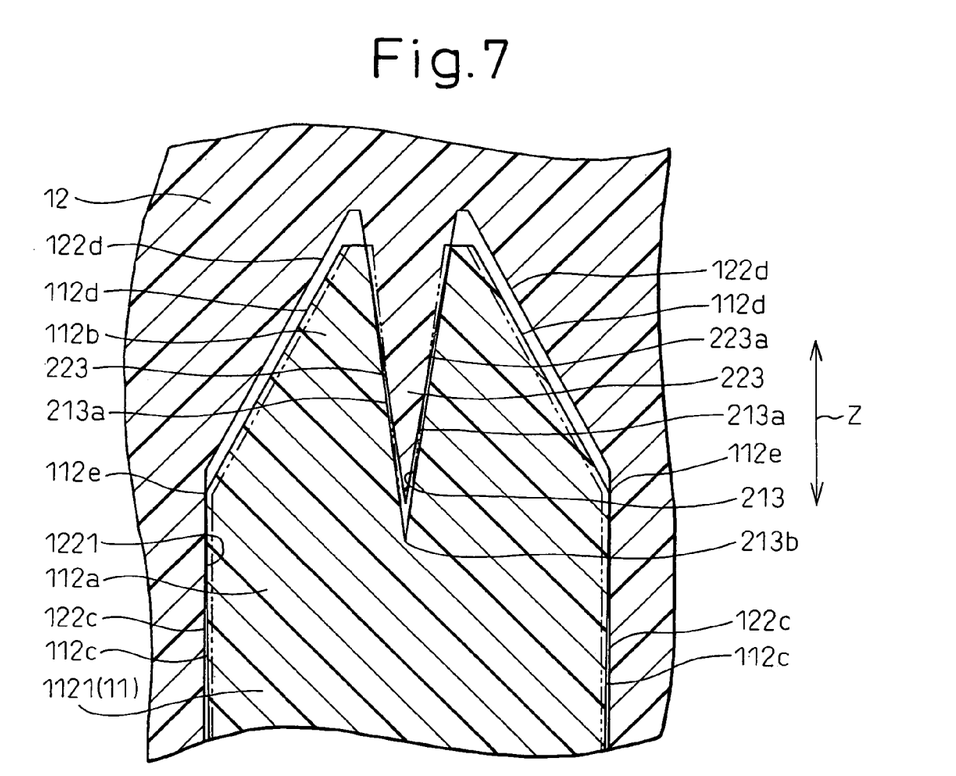
FIG. 7 is an enlarged cross-sectional view of principal parts of an air-conditioner case 10 of an indoor unit 1 in a second embodiment.

Note that FIG. 5 is a view corresponding to FIG. 2 of the first embodiment in the present embodiment, FIG. 6 is a view corresponding to FIG. 3 of the first embodiment in the present embodiment, and FIG. 7 is a view corresponding to FIG. 4 of the first embodiment in the present embodiment.

As shown in FIG. 5, in the present embodiment, the engagement projection 1121 of the case member 11 is formed with a V-shaped cross-section recess 213 of a form sunk down from the front end of the tip 112b toward the root side of the flat plate part 112a (toward joint face 111 direction at illustrated bottom side) and extends around the entire surface of the joint face.

This recess 213 is sunk down from the tip 112b and has a bottom (deepest part) 213b formed in the region of the flat plate part 112a and thereby forms a relatively deep groove shape.

On the other hand, the engagement groove 1221 of the case member 12 is formed with a projection 223 mating with the recess 213 formed in the engagement projection 1121 of the case member 11. The projection 223 forms a wedge shape (V-shaped cross-section) sticking out from the bottom surface of the engagement groove 1221 (illustrated top end face) toward the joint face 121 direction of the illustrated bottom side and extends around the entire surface of the joint face.

Note that the projection 223 is formed so that an angle B between the two flat faces 223a forming the V-shape becomes larger than an angle A between the two flat faces 213a forming the V-shape of the recess 213.

Due to this, as shown in FIG. 6 and FIG. 7, when engaging the engagement projection 1121 and the engagement groove 1221, the recess 213 of the engagement projection 1121 is enlarged by the projection 223 of the engagement groove 1221 being press-fit into it. Specifically, the wedge shape projection 223 enters the recess 213 and abuts against and pushes open the illustrated top end opening of the recess 213.

Along with this, as shown in FIG. 7, the engagement projection 1121 elastically deforms from the two-dot chain position to the solid line position. In the engagement projection 1121, mainly the illustrated top location from the bottom 213b of the recess 213 deforms to open wider at its two sides.

The bottom 213b of the recess 213 is inside the flat plate part 112a of the engagement projection 1121, so the points where the flat faces 112c of the engagement projection 1121 change to the inclined faces 112d, that is, the inflection points 112e, are at illustrated top locations from the bottom 213b of the recess 213. Therefore, along with the above-mentioned elastic deformation, the inflection points 112e at the outer circumference of the engagement projection 1121 (parts of side surfaces) abut against the inside walls of the engagement groove 1221.

According to the above-mentioned configuration, the projection 223 formed in the engagement groove 1221 and the recess 213 formed in the engagement projection 1121 abut against each other. Further, the recess 213 is enlarged by the projection 223 and the outer circumference inflection points 112e at the side surfaces of the engagement projection 1121 abut against the engagement groove 1221.

Therefore, not only do the projection 223 and recess 213 abut against each other, but also the side surfaces of the engagement projection 1121 and the engagement groove 1221 abut against each other, whereby the sealing ability can be reliably improved.

The engagement projection 1121 of the present embodiment has a tip 112b narrower in width at the front end the further to the front end side so as to improve the efficiency of engagement work into the engagement groove 1221. In this way, even with the engagement projection 1121 having the tip 112b, the engagement projection 1121 is opened wider along with the projection 223 being press fit into the recess 213 and the side surfaces of the engagement projection 1121 can closely contact the insides of the engagement groove 1221.

Further, the projection 223 has a wedge shape. It can easily be press fit into the recess 213, the recess 213 can be easily opened wider, and the side surfaces of the engagement projection 1121 forming the recess 213 can be made to closely contact the engagement groove 1221.

Further, since the projection 223 is wedge shaped, the action of opening up the recess 213 when press fit into it occurs relatively at the end of the engagement operation. Therefore, the side surfaces of the engagement projection 1121 will not closely contact the engagement groove 1221 early, so the engagement work becomes easy.

Note that in the present embodiment as well, in the same way as the first embodiment, the recess 213 has a length in the engagement direction Z of the engagement projection 112 and the engagement groove 122 smaller than the length (height) of the flat faces (corresponding to guide surfaces) 112c of the engagement projection 112 in the engagement direction Z.

Further, the engagement groove 122 is formed to mate with the shape of the engagement projection 112, while the projection 223 is formed to mate with the shape of the recess 213. Therefore, the projection 223 has a height in the engagement direction Z of the engagement projection 112 and engagement groove 122 smaller than the length (depth) of the flat faces 122c of the engagement groove 122 in the engagement direction Z.

According to this, when assembling together the case members 11, 12, the engagement projection 112 and engagement groove 122 are guided by the guide surfaces, that is, the flat faces 112c, and start to engage in the Z-direction, then the recess 213 and the projection 223 can start to be mated. That is, the guiding action of the flat faces 112c and 122c of the engagement projection 112 and engagement groove 122 enables the recess 213 and the projection 223 to be mated. Therefore, even if the surfaces 213a of the recess 213 in the engagement direction Z and the surfaces 223a of the projection 223 in the engagement direction Z are close, the recess 213 and the projection 223 can be easily mated.

Other Embodiments

In the above embodiments, there was a single set of the recess provided at the engagement projection and the projection provided at the engagement groove, but the single set of the engagement projection and engagement groove may also be provided with a plurality of sets of recesses and projections. However, a single set of the recess and projection enables the size of the engagement part to be more easily kept from becoming larger.

Further, in the second embodiment, the recess 213 was opened wider by the projection 223 being press fit into the engagement groove 1221 and outer circumference inflection points 112e at the side surfaces of the engagement projection 1121 abutted against the engagement groove 1221, but it is also possible, without going so far as an abutting action, to make the clearance between the side surfaces of the engagement projection 1121 and the engagement groove 1221 smaller so as to improve the sealing ability.

Further, if the desired sealing ability can be secured, it is also possible to just have the recess and projection abut against each other and not change the clearance between the side surfaces of the engagement projection and the inside walls of the engagement groove. In this case, the angle B of the projection of the wedge shape may be equal to the angle A of the recess.

Further, the projection 223 was made a wedge shape, but the invention is not limited to this. For example, it may also be made trapezoidal or substantially columnar in cross-section.

Further, in the above embodiments, the engagement projection has flat faces 112c extending in the engagement direction (parallel to the engagement direction) and the engagement groove has flat faces 112c extending in the engagement direction (parallel to the engagement direction), but it is also possible to combine an engagement projection and engagement groove without flat faces or to combine an engagement projection and engagement groove having flat faces extending in directions other than the engagement direction.

Further, in the above embodiments, the recess formed in the engagement projection was formed sunk down from the front end of the engagement projection, but the invention is not limited to this. For example, it may also be formed so as to be sunk down in parallel to the engagement direction Z from a tip inclined face rather than the front end of the engagement projection toward the root side of the engagement projection. However, from the viewpoint of the formability of the case member, it is preferable to form the recess sunk down from the front end of the engagement projection.

Further, in the first embodiment, it was explained that, in comparison with a structure of the related art providing the guide pin shown in FIG. 9, the flat faces of the engagement projection serve as guide surfaces imparting a guide action and that even if the size of the engagement part is made smaller than the related art, good sealing ability can be secured without causing a drop in the assembly ability, but it is also possible to apply the present invention to a structure employing a guide pin and thereby greatly improve the sealing ability.

Figure 8:
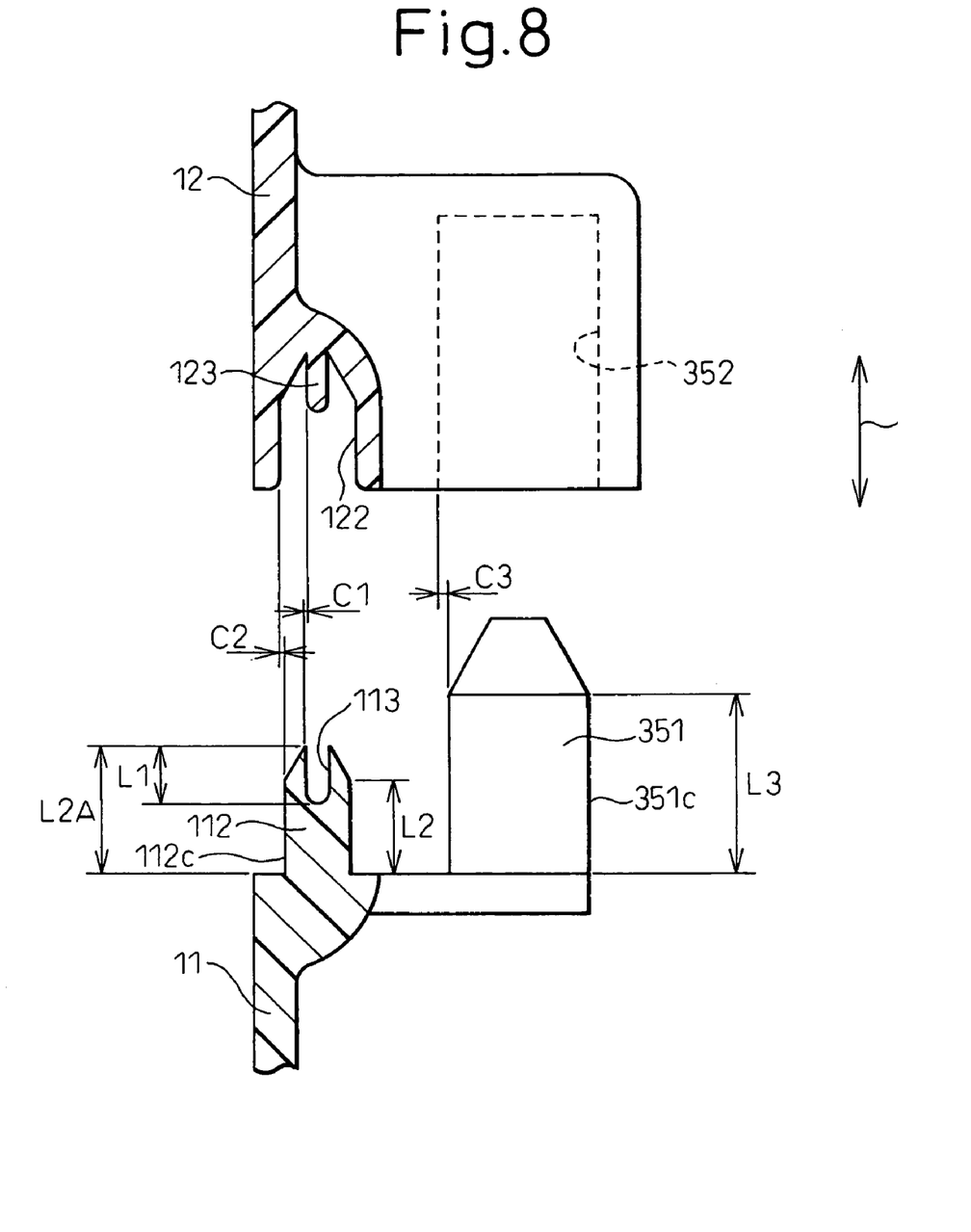
FIG. 8 is a cross-sectional view of principal parts of an air-conditioner case 10 of an indoor unit 1 in another embodiment and shows the state before joining the separately formed case members together.

For example, as shown in FIG. 8, it is also possible to provide a guide pin 351 and guide pin hole 352 at the outside of the case engagement part comprised of the engagement projection 112 and engagement groove 122, make the height L3 of the guide surface 351c of the guide pin 351 in the engagement direction (Z-direction) larger than the height L2A of the engagement projection 912 in the engagement direction, and make the height L1 of the recess 113 in the engagement direction smaller than the height L2 of the flat faces (guide surfaces) 112c of the engagement projection 112 in the engagement direction.

Due to this, it is possible to set the assembly clearance dimension C3 of the guide pin 351 and the guide pin hole 352 (in this example, 0.5 mm) larger than the assembly clearance dimension C2 between the engagement projection 112 and engagement groove 122 (in this example, 0.3 mm) to improve the assembly ability and use the guide surface 351c of the guide pin 351 and the inside circumference of the guide pin hole 352 to guide the engagement between the engagement projection 112 and engagement groove 122.

Further, it is possible to set the assembly clearance dimension C1 of the recess 113 and the projection 123 (in this example, 0.1 mm) smaller than the assembly clearance dimension C2 of the engagement projection 112 and engagement groove 122 and use the flat faces 112c of the engagement projection 112 and the flat faces 122c of the engagement groove 122 to guide the engagement of the recess 113 and projection 123 and thereby greatly improve the sealing ability without causing a drop in the assembly ability.

In this way, by successively switching the guide function location from a location with a long engagement direction length (guide surface 351c of guide pin 351) to a short location (flat faces 112c of engagement projection 112), it is possible to make the dimension C1 of the clearance 133 between the recess 113 and projection 123 at the final engagement location very small and possible to greatly improve the sealing ability.

Further, in the embodiments, the air-conditioner case 10 was comprised of two separately formed left and right case members joined together, but the shape and split form of the air-conditioner case are not limited to this. The present invention can be effectively applied to engagement of case members split into a greater plurality of pieces as well.

Further, in the above embodiments, the air-conditioning system was one mounted in a vehicle, but the present invention can be applied to an air-conditioning system other than a vehicular use air-conditioning system as well. For example, it may also be applied to an air-conditioning system for the home, factory, store, etc. However, in general, vehicular use involves major restrictions on the mounting space and tough environmental conditions such as vibration and temperature, so when the present invention is applied to a vehicular use air-conditioning system, there is the extremely great effect that the sealing ability can be improved without making the engagement location larger.

While the invention has been described by reference to specific embodiments chosen for the purposes of illustration, it should be apparent that numerous modifications could be made thereto by those skilled in the art without departing from the basic concept and scope of the invention.

The invention claimed is:

1. An air-conditioning system
provided with an air-conditioner case comprised of a separately formed first case member and second case member joined together by engagement of an engagement projection formed at a joint face of said first case member and an engagement groove formed at a joint face of said second case member and
circulating air blown into a passenger compartment inside said air-conditioner case, wherein
said engagement projection is formed with a recess and said engagement groove is formed with a projection mating with the shape of said recess;

said projection and said recess are separated from each other to form a clearance between said projection and said recess; and said engagement projection and said engagement groove are separated from each other to form a clearance between said engagement projection and said engagement groove.

2. An air-conditioning system as set forth in claim 1, wherein said projection has flat faces parallel to an engagement direction of said engagement projection and said engagement groove, and said recess has flat faces parallel to an engagement direction mating with said flat faces of said projection.

3. An air-conditioning system as set forth in claim 2, wherein said engagement projection has flat faces parallel to said engagement direction at its side surfaces, and said engagement groove has flat faces parallel to said engagement direction at its side surfaces mating with said flat faces of said engagement projection.

4. An air-conditioning system as set forth in claim 1, wherein said engagement projection has guide surfaces formed in parallel to the engagement direction of said engagement projection and said engagement groove and sliding with inside surfaces of said engagement groove parallel to said engagement direction so as to guide said engagement projection into said engagement groove when engaging said engagement projection and said engagement groove, said recess is formed so as to be sunk down in said engagement direction from a location at a front end side from a location of formation of said guide surfaces of said engagement projection toward a root side of said engagement projection, and said recess has a length in said engagement direction smaller than a length of said guide surface in said engagement direction.

5. An air-conditioning system provided with an air-conditioner case comprised of a separately formed first case member and second case member joined together by engagement of an engagement projection formed at a joint face of said first case member and an engagement groove formed at a joint face of said second case member and circulating air blown into a passenger compartment inside said air-conditioner case, wherein said engagement projection is formed with a recess and said engagement groove is formed with a projection mating with the shape of said recess;

said projection and said recess abut against each other; and said projection causes said recess to be opened wider and side surfaces of said engagement projection abut against said engagement groove.

6. An air-conditioning system as set forth in claim 5, wherein said projection is wedge shaped.

7. An air-conditioning system as set forth in claim 5, wherein said engagement projection is comprised of a flat plate part with a substantially uniform width and a tip with a width gradually reduced from a front end of said flat plate part toward a front end side of said engagement projection, and said recess is sunk down from said tip and has a bottom formed at said flat plate part.

* * * * *

UNITED STATES PATENT AND TRADEMARK OFFICE
CERTIFICATE OF CORRECTION

PATENT NO. : 7,607,888 B2  Page 1 of 1
APPLICATION NO. : 11/591415
DATED : October 27, 2009
INVENTOR(S) : Hori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 406 days.

Signed and Sealed this

Twelfth Day of October, 2010

David J. Kappos
*Director of the United States Patent and Trademark Office*